(12) United States Patent
Lampes

(10) Patent No.: US 6,199,871 B1
(45) Date of Patent: Mar. 13, 2001

(54) HIGH EXCURSION RING SEAL

(75) Inventor: Elias H. Lampes, Lynnfield, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/145,891

(22) Filed: Sep. 2, 1998

(51) Int. Cl.[7] ............... F16J 15/48; F01D 25/26
(52) U.S. Cl. ................ 277/614; 277/644; 415/134
(58) Field of Search ................ 277/614, 641, 277/644, 597, 931; 415/134, 135, 136, 137, 138, 139

(56) References Cited

U.S. PATENT DOCUMENTS

| | | |
|---|---|---|
| 1,151,112 | 8/1915 | Magarrell . |
| 1,382,465 | 6/1921 | Bramberry . |
| 1,447,533 | 3/1923 | Chopieska . |
| 4,063,845 * | 12/1977 | Allen .................................. 277/614 |
| 4,125,929 | 11/1978 | Rode .................................. 29/446 |
| 4,218,067 | 8/1980 | Halling . |
| 4,452,462 | 6/1984 | Karr, Jr. ............................ 277/105 |
| 4,477,086 | 10/1984 | Feder et al. . |
| 5,058,906 | 10/1991 | Adamek et al. ................ 277/167.5 |
| 5,158,430 | 10/1992 | Dixon et al. ..................... 415/134 |
| 5,240,263 * | 8/1993 | Nicholson ......................... 277/614 |
| 5,372,476 | 12/1994 | Hemmelgarn et al. . |
| 5,624,227 | 4/1997 | Farrell ............................. 415/139 |
| 5,639,100 * | 6/1997 | Gaggigues et al. ............... 277/614 |
| 5,669,612 * | 9/1997 | Nicholson ......................... 277/614 |
| 5,716,052 | 2/1998 | Swensen et al. . |
| 6,076,835 * | 6/2000 | Ress et al. ........................ 277/637 |

\* cited by examiner

Primary Examiner—Anthony Knight
Assistant Examiner—Enoch Peavey
(74) Attorney, Agent, or Firm—Andrew C. Hess; Rodney M. Young

(57) ABSTRACT

A seal includes first and second axially opposite loops integrally joined together by a coextensive web in a collective ring having a circumferential split. The two loops are arcuate in section, with radially outer and inner sealing lands. And, the web is disposed radially between the outer and inner lands. The loops are disposed in corresponding grooves of adjoining members for effecting a seal therebetween and accommodating differential radial and axial thermal movement.

20 Claims, 2 Drawing Sheets

HIGH EXCURSION RING SEAL

BACKGROUND OF THE INVENTION

The present invention relates generally to gas turbine engines, and, more specifically, to seals therein.

In a gas turbine engine, air is pressurized in a compressor, mixed with fuel in a combustor, and ignited for generating hot combustion gases which flow downstream through several turbine stages which extract energy therefrom. The pressurized air surrounds the combustor and is used for cooling the liners thereof. The pressurized air is also used to cool other components of the engine as well.

Since the engine is formed of stator components which are suitably joined together, various types of static seals must be provided therebetween to reduce or prevent undesirable leakage of either the pressurized air or the hot combustion gases. The seals have different cross-sectional configurations for specifically sealing different components. For example, the seals may have a W-shape cross-section, or an E-shape, or simply circular cross-sections depending upon the specific application requiring sealing.

Some seals are full rings, or they may be circumferentially split at one location to eliminate undesirable hoop stress therein. Another type of seal is in the form of a flat, straight leaf seal disposed in complementary slots between adjoining components.

The seals are subject to various differential thermal movement between the adjoining components including differential radial movement, differential axial movement, or both. Relative radial and axial deflections are common between the aft end of the combustor outer liner and the forward end of the outer band of the adjoining high pressure turbine nozzle. Under the high temperature of the combustion gases produced in the combustor, the outer liner can expand radially outwardly significantly more than the radially outer expansion of the outer band. And, the axial gap between the two components may also grow substantially large during operation.

Accordingly, one form of leaf seal is used at this location in which a radial leaf seal engages a complementary radial slot for accommodating differential radial movement, and an axial leaf seal engages a complementary axial slot for accommodating differential axial movement. However, since the leaf seals are straight in cross-section and can distort during operation, their sealing ability can be compromised. Furthermore, some leaf seals are provided in segments, which interrupt the sealing capability between the segments.

Accordingly, it is desired to provide an improved ring seal for sealing high excursion differential radial and axial movement between gas turbine engine stator components.

BRIEF SUMMARY OF THE INVENTION

A seal includes first and second axially opposite loops integrally joined together by a coextensive web in a collective ring having a circumferential split. The two loops are arcuate in section, with radially outer and inner sealing lands. And, the web is disposed radially between the outer and inner lands. The loops are disposed in corresponding grooves of adjoining members for effecting a seal therebetween and accommodating differential radial and axial thermal movement.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
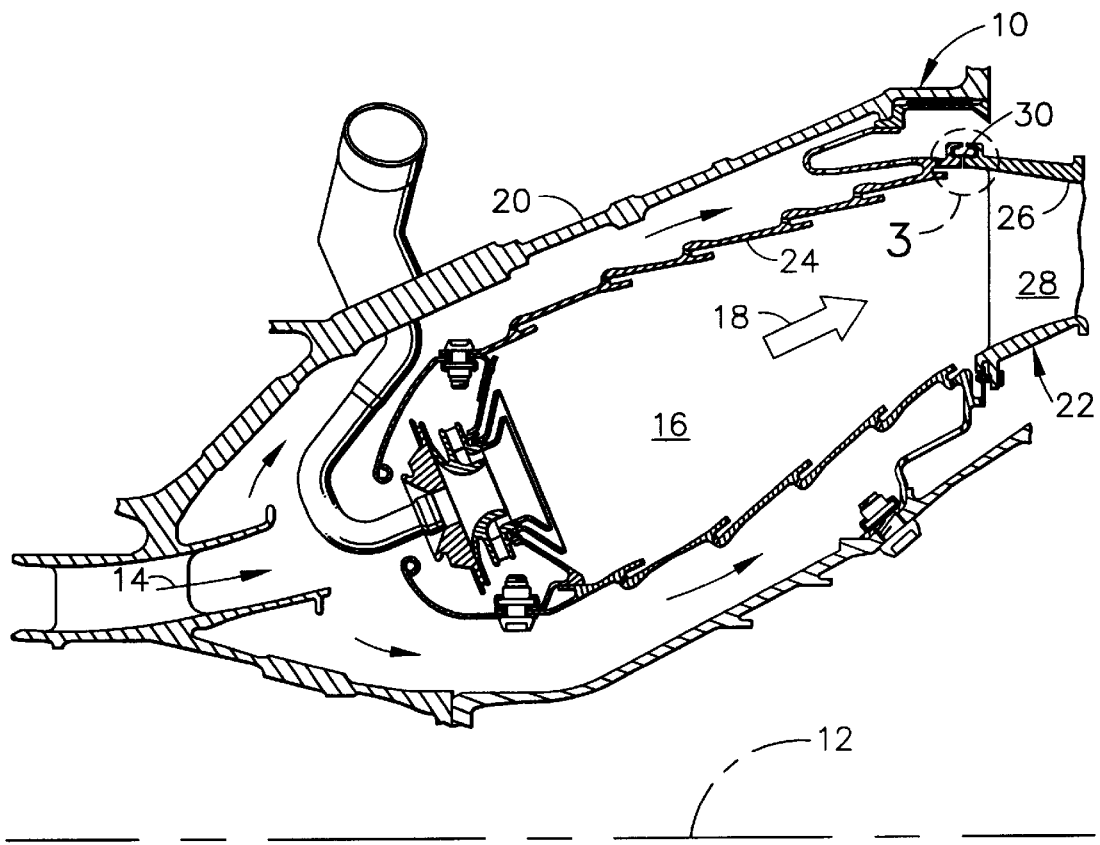
FIG. 1 is an axial sectional view through a portion of a gas turbine engine having a seal in accordance with an exemplary embodiment between a combustor outer liner and an outer band of turbine nozzle.

Illustrated in FIG. 1 is a portion of a gas turbine engine 10 which is axisymmetrical about a longitudinal or axial centerline axis 12. The engine includes a multistage axial compressor (not shown) for pressurizing air 14 which is channeled to an annular combustor 16 wherein it is mixed with fuel and ignited for generating hot combustion gases 18. The combustor 16 is mounted inside a combustor casing 20 and discharges the combustor gases 18 into a downstream high pressure turbine nozzle 22. Disposed downstream from the nozzle 22 are high and low pressure turbines (not shown) which extract energy from the combustion gases for powering the compressor, and typically also powering a fan for producing propulsion thrust for powering an aircraft in flight.

The combustor 16 includes a radially outer liner 24 which defines an outer boundary for the combustion gases 18. The turbine nozzle 22 includes a radially outer band 26 which defines a radially outer boundary for the combustion gases inside the nozzle which are channeled between a plurality of circumferentially spaced apart nozzle vanes 28 extending radially inwardly from the outer band 26.

The combustor also includes a radially inner liner cooperating with a radially inner band of the nozzle for defining a radially inner flowpath boundary for the combustion gases 18 as they flow from the combustor to the nozzle.

Since the combustor and nozzle are separately manufactured components, they must be assembled together in the engine and suitably sealed to prevent flow leakage of either the pressurized air 14 or the combustion gases 18. During operation, a portion of the pressurized air 14 surrounds the combustor inside the casing 20 and typically has a higher pressure than that of the combustion gases 18 therein. In order to prevent undesirable leakage of the pressurized air 14 radially inwardly into the combustion gas flowpath between the combustor and the nozzle, a ring seal 30 is formed between the outer liner 24 and the outer band 26.

But for the ring seal 30 disposed between the outer liner and the outer band, the engine 10 may be otherwise conventional in construction and operation. The sealed joint between the outer liner and the outer band is subject to relatively high excursions both radially and axially due to thermal expansion and contraction caused by the hot combustion gases 18 during operation. Accordingly, the seal 30 is configured in accordance with the present invention for accommodating the high axial and radial excursions at this location in a relatively simple and efficient design which maximizes the sealing effectiveness thereof.

Figure 2:
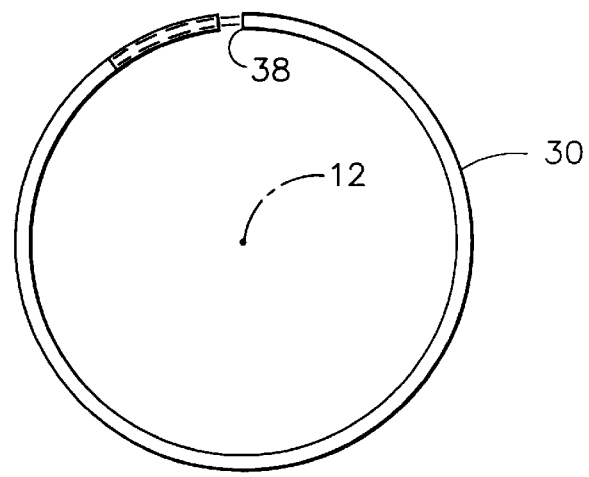
FIG. 2 is an elevational, face view of the ring seal illustrated in FIG. 1 in accordance with an exemplary embodiment of the present invention.
Figure 3:
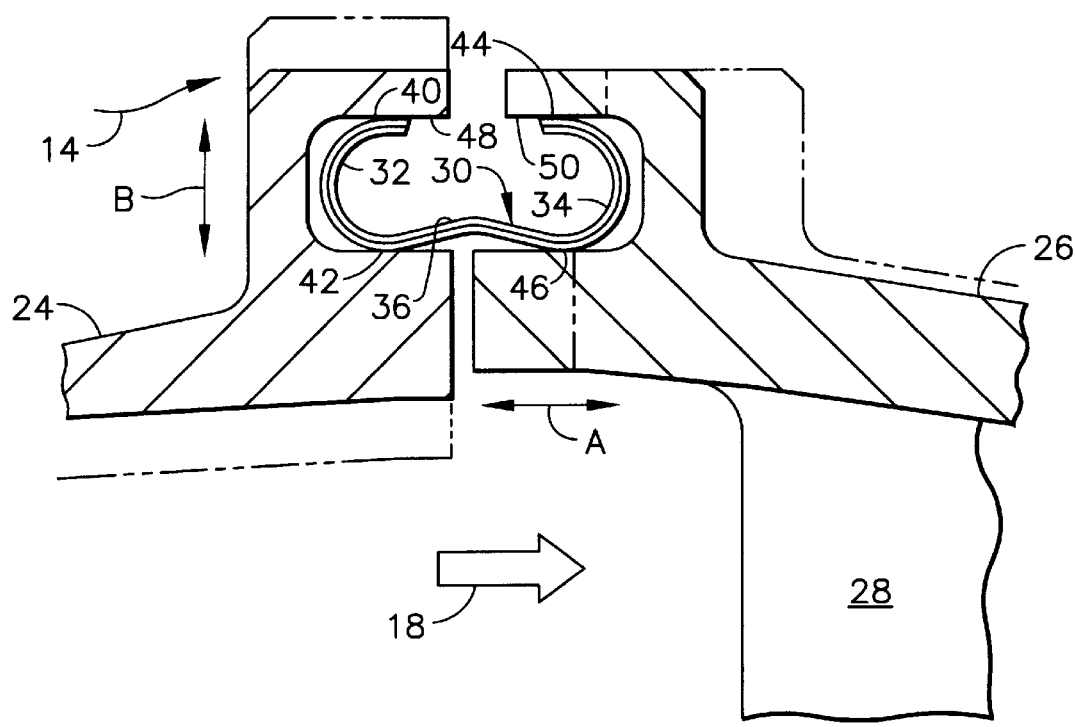
FIG. 3 is an enlarged, axial sectional view through the ring seal mounted between the outer liner and band of FIG. 1 within the dashed circle labeled 3.

More specifically, the high excursion ring seal 30 is illustrated in isolation in FIG. 2, and in enlarged section in FIG. 3. The seal includes first and second axially opposite loops 32,34 integrally joined together in a unitary component by a coextensive septum or web 36 in a collective seal ring having a circumferential gap or split 38, as shown in FIG. 2. The split 38 interrupts the circumferential extent of the seal ring at one location to prevent the generation of undesirable hoop stress therein.

Figure 4:
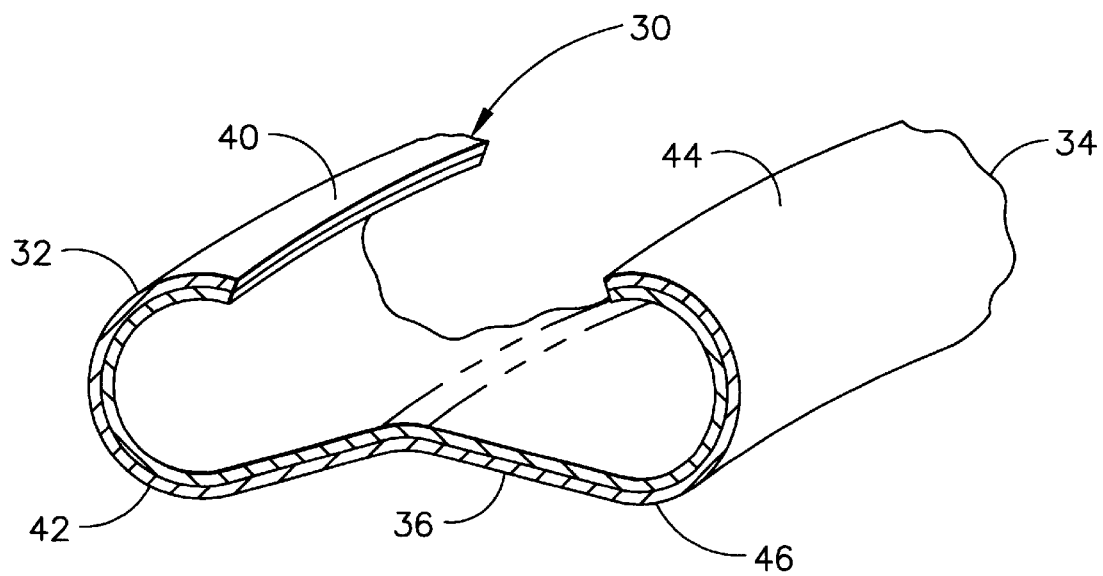
FIG. 4 is an isometric view of a portion of the ring seal illustrated in FIG. 3.

The ring seal is illustrated in more particularity in FIGS. 3 and 4. The first loop 32 is arcuate in cross-section, with radially outer and inner first sealing lands 40,42 which extend circumferentially around the ring. Similarly, the second loop 34 is arcuate in cross-section, with radially outer and inner second sealing lands 44,46 also extending circumferentially around the ring.

The web 36 is disposed radially between the outer and inner lands of the first and second loops in a compact cross-section with reduced bending moment of inertia for maintaining the flexibility of the seal ring and allowing it to twist during operation under the high differential radial thermal movement between the outer liner 24 and outer band 26.

As shown in FIG. 4 for example, the first and second loops are preferably convex axially outwardly away from each other, and concave axially inwardly toward each other, and are radially aligned or coextensive. The first and second loops are also axially spaced apart from each other, with the web 36 extending axially therebetween.

In the preferred embodiment illustrated in FIG. 4, the web 36 is integrally joined to the first and second inner lands 42,46 of the opposite loops, and the loops are not otherwise joined together at the first and second outer lands 40,44 which are simply axially spaced apart by the axial extent of the web 36.

In a preferred embodiment, the first and second loops are semi-circular in section, and the web 36 is primarily straight in axial cross-section. The first and second loops and integral web are preferably formed of thin gauge imperforate sheet metal in one or more laminates as desired. Two nested sheet metal laminates or plies are illustrated in FIG. 4 so that the inner laminate may extend across the circumferential split 38 illustrated in FIG. 2 to slidingly engage the outer laminate and bridge the split for improving sealing therebetween while allowing unrestrained circumferential expansion and contraction of the ring seal 30.

As shown in FIG. 3, the ring seal 30 is mounted between the outer liner 24 and the outer band 26 with the first and second loops 32,34 being axially aligned with each other at equal radii from the engine centerline. The web 36 is preferably spaced radially outward of the first and second inner lands 42,46 and radially inward of the first and second outer lands 40,44 to provide flexibility in the ring seal 30 by reducing its bending moment of inertia.

Notwithstanding its specific cross-section, the seal 30 is nevertheless a full ring except for the circumferential split 38, and operates with three degrees of freedom. The partly race-track axial cross-section of the seal in accordance with the present invention provides effective sealing between the outer liner and the outer band while accommodating high differential excursions in both the radial and axial directions, without the seal itself significantly restraining the differential movements, and without experiencing excessive reaction loads and stresses therein.

More specifically, the outer liner 24 illustrated in FIG. 3 defines a first annular member through which the combustion gases 18 are channeled, and includes an axially aft facing first annular seat or groove 48 at the aft end thereof which receives in sliding contact therein the first loop 32 in a tongue-and-groove sealing arrangement. Similarly, the outer band 26 defines a second annular member disposed coaxially with the outer liner 24, and has an axially forwardly facing second annular seat or groove 50 at its forward end which receives in sliding contact therein the second loop 34 in a tongue-and-groove sealing arrangement.

The outer liner 24 and the outer band 26 are axially spaced apart at the first and second grooves 48,50, and the web 36 extends axially therebetween.

Sealing is effected during operation primarily by contact of the first inner land 42 against the bottom of the first groove 48 around the circumference thereof, and by contact of the second inner land 46 against the bottom of the second groove 50 around the circumference thereof. The intervening web 36 is imperforate and reacts the differential pressure radially across the seal which improves the sealing contact between the first and second inner lands 42,46 and their seats.

Furthermore, the first and second outer lands 40,44 are also available for effecting corresponding seals with the tops of the respective grooves 48,50 as required.

Differential axial thermal movement caused by expansion or contraction is illustrated in FIG. 3 in the phantom line excursion of the outer band 26 in the axial direction designated A. The axial size of the grooves 48,50, and the axial extent of the web 36 are selected to ensure that the first and second loops 32,34 remain at all times within their corresponding grooves in sealing contact therewith irrespective of the magnitude of the differential axial movement between the outer liner 24 and outer band 26.

Differential radial movement B is also illustrated in FIG. 3 by the different radial positions of the outer liner 24 shown in phantom. To accommodate the differential radial excursion between the two components, the ring seal 30 will twist in the radial direction while the first and second loops 32,34 remain in sealing contact in their respective grooves 48,50.

Since the seal 30 is an annular member, sufficient twisting flexibility must be provided therein for permitting the high radial excursion without excessive restraint or distortion thereof leading to excessive stress or plastic deformation. The axisymmetrical loops and the intervening web 36 interrupt the section perimeter for increasing its twisting flexibility in a compact arrangement providing both high axial and radial excursion capability. As indicated above, the web 36 is spaced between the respective outer and inner lands for minimizing the radial moment of inertia which increases the bending or twisting flexibility thereof.

And, the web 36 is generally concave radially inwardly in section to permit differential radial movement between the outer liner 24 and outer band 26 without interference therewith. As shown in FIG. 3, the web 36 is preferably straight in axial section, and bent in two flat sections from its midpoint having a suitable blending radius, with a radially inner surface of the web having an obtuse included angle slightly less than 180° for both increasing twisting flexibility and allowing radial differential movement between the first and second loops 32,34 without the web 36 engaging corresponding portions of the first and second grooves 48,50.

For example, as the first or left loop 32 illustrated in FIG. 3 is carried radially outwardly with the outer liner 24 during thermal expansion thereof to a greater extent than that of the outer band 26, the left loop will rotate slightly clockwise in the left groove 48 with the left portion of the web 36 moving closer to the bottom of the left groove. Correspondingly, the second or right loop 34 will also rotate clockwise in this example, with the right portion of the web 36 moving outwardly from the bottom of the right groove 50. As this occurs, the seal 30 elastically twists through the web 36 to position the opposite loops 32,34 at different radii from the engine centerline axis.

The use of the ring seal 30 between the outer liner 24 and outer band 26 accommodates both high excursion differential radial and axial movement therebetween in a compact and relatively simple configuration. The outer liner 24 merely requires the singular axially aft facing first groove 48, and the outer band 26 merely requires the singular axially forwardly facing second groove 50. The dual-function ring seal 30 is seated in both grooves to accommodate differential axial movement therebetween as well as differential radial movement while maintaining effective sealing at the two loops 32,34.

Under differential axial movement, the ring seal 30 has an undeformed, common radius between the two end loops and simply slides axially within the two grooves while maintaining effective sealing. Furthermore, the same configuration allows the ring seal 30 to elastically twist for permitting the first and second loops 32,34 to spread apart radially as they are carried within the respective grooves 48,50 to different radial positions under differential thermal growth.

The elastic web 36 therefore bridges together the first and second loops 32,34 for permitting this dual capability. The web 36 is preferably disposed on the radially inner ends of the loops for minimizing seal rigidity. But, in an alternate embodiment the web 36 may instead join together the first and second outer lands 44,46 if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An excursion seal for sealing an axial gap between first and second adjoining annular members subject to differential axial and radial excursion therebetween during fluid channeling operation, comprising:
    first and second axially opposite loops integrally joined together by a coextensive web in a collective ring having a circumferential split and uniform gauge;
    said first loop being arcuate in section, with radially outer and inner sealing lands sized to engage a first annular groove extending axially in said first member for accommodating said axial excursion;
    said second loop being arcuate in section, with radially outer and inner sealing lands sized to engage a second annular groove extending axially in said second member for accommodating said axial excursion; and
    said web being disposed radially between said outer and inner lands of said first and second loops for reducing bending moment of inertia to permit twisting of said seal to accommodate said radial excursion.

2. A seal according to claim 1 wherein said first and second loops are convex axially outwardly and are axially spaced apart from each other, with said web extending axially therebetween.

3. A seal according to claim 2 wherein said web is spaced radially outward of said first and second inner lands and radially inward of said first and second outer lands.

4. A seal according to claim 3 wherein said web is integrally joined to said first and second inner lands.

5. A seal according to claim 3 wherein said first and second loops are semi-circular.

6. A seal according to claim 3 wherein said first and second loops and web are sheet metal.

7. A seal according to claim 3 in combination with said two annular members, and wherein:
    said first annular groove receives in sliding contact therein said first loop; and
    said second annular groove receives in sliding contact therein said second loop.

8. A seal according to claim 7 wherein said first and second members are spaced axially apart at said first and second grooves thereof for unrestrained differential axial and radial movement threrebetween, and said web extends axially therebetween.

9. A seal according to claim 8 wherein said web is concave radially inwardly in section to permit differential radial movement between said first and second members without interference therewith.

10. A seal according to claim 9 wherein:
    said first member is a gas turbine engine combustor outer liner for channeling therethrough hot combustion gases; and
    said second member is a gas turbine engine turbine nozzle outer band sealingly joined to said outer liner by said seal ring for accommodating both differential radial and axial movement therebetween due to said combustion gases.

11. An excursion seal for sealing an axial gap between a gas turbine engine combustor outer liner and a turbine nozzle outer band subject to differential axial and radial excursion therebetween during channeling of combustion gases therethrough, comprising:
    first and second axially opposite single loops integrally joined together by a coextensive web in a collective ring having a circumferential split and uniform gauge;
    said first loop being arcuate in section, with radially outer and inner sealing lands sized to engage a first annular groove extending axially in said outer liner for accommodating said axial excursion;
    said second loop being arcuate in section, with radially outer and inner sealing lands sized to engage a second annular groove extending axially in said outer band for accommodating said axial excursion; and
    said web being disposed radially between said outer and inner lands of said first and second loops for reducing bending moment of inertia to permit twisting of said seal to accommodate said radial excursion.

12. A seal according to claim 11 wherein said first and second loops are convex axially outwardly and are axially spaced apart from each other, with said web extending axially therebetween.

13. A seal according to claim 12 wherein said web is spaced radially outward of said first and second inner lands and radially inward of said first and second outer lands.

14. A seal according to claim 13 further comprising first and second nested sheet metal laminates defining said two loops and web, with said first laminate extending circumferentially across said split to engage said second laminate.

15. A seal according to claim 13 wherein said first and second loops are semi-circular.

16. A seal according to claim 13 wherein said first and second loops and web are sheet metal in a unitary construction.

17. A seal according to claim 13 in combination with said outer liner and outer band, and wherein:

said first annular groove receives in sliding contact therein said first loop; and said second annular groove receives in sliding contact therein said second loop.

18. A seal according to claim 17 wherein said outer liner and outer band are spaced axially apart at said first and second grooves thereof for unrestrained differential axial and radial movement therebetween, and said web extends axially therebetween.

19. A seal according to claim 18 wherein said web is concave radially inwardly in two straight sections to permit differential radial movement between said first and second members without interference therewith.

20. A method of using said seal according to claim 13 comprising:

channeling said combustion gases through said outer liner and outer band for thermally expanding radially outwardly said outer liner greater than said outer band; and twisting said seal to accommodate said differential radial expansion while said first and second loops remain in sealing contact in said first and second grooves.

* * * * *